US011601599B1

(12) United States Patent
Leidich et al.

(10) Patent No.: US 11,601,599 B1
(45) Date of Patent: Mar. 7, 2023

(54) AERIAL IMAGE CAPTURE SYSTEM WITH SINGLE AXIS CAMERA ROTATION

(71) Applicant: URBAN SKY, Denver, CO (US)

(72) Inventors: Jared Leidich, Denver, CO (US); Maxmillion J. W. McLaughlin, Fort Myers, FL (US)

(73) Assignee: URBAN SKY THEORY INC., Denver, CO (US)

( * ) Notice: Subject to any disclaimer, the term of this patent is extended or adjusted under 35 U.S.C. 154(b) by 0 days.

(21) Appl. No.: 17/586,559

(22) Filed: Jan. 27, 2022

Related U.S. Application Data

(60) Provisional application No. 63/164,288, filed on Mar. 22, 2021.

(51) Int. Cl.
*H04N 5/232* (2006.01)
*B64B 1/40* (2006.01)
*B64D 47/08* (2006.01)
*H04N 5/225* (2006.01)

(52) U.S. Cl.
CPC ........... *H04N 5/23299* (2018.08); *B64B 1/40* (2013.01); *B64D 47/08* (2013.01); *H04N 5/2253* (2013.01); *H04N 5/23238* (2013.01)

(58) Field of Classification Search
CPC ........... H04N 5/23299; H04N 5/23238; H04N 5/2253; B64B 1/40; B64D 47/08
See application file for complete search history.

(56) References Cited

U.S. PATENT DOCUMENTS

| | | | | |
|---|---|---|---|---|
| 9,374,561 | B1 * | 6/2016 | Reece | G03B 37/04 |
| 9,753,356 | B2 | 9/2017 | Liang et al. | |
| 2012/0081552 | A1 * | 4/2012 | Sablak | H04N 5/23299 348/169 |
| 2016/0201847 | A1 * | 7/2016 | Firchau | F16M 11/18 224/567 |
| 2017/0248421 | A1 * | 8/2017 | Cope | G01S 19/51 |
| 2021/0129987 | A1 * | 5/2021 | Foong | G05D 1/101 |

FOREIGN PATENT DOCUMENTS

DE 202011050944 * 12/2011

* cited by examiner

*Primary Examiner* — Kathleen V Nguyen
(74) *Attorney, Agent, or Firm* — Holzer Patel Drennan

(57) ABSTRACT

An example arial image capture system captures a sequence of images from a camera attached to a flight vehicle while the flight vehicle moves in a lateral direction relative to underlying terrain and while concurrently rotating the camera along a circular path about an axis of rotation. The rotation of the camera controllably alters the camera's field-of-view to trace a curved swath of the underlying terrain with each rotation period of the camera around an area external to the camera's field-of-view.

17 Claims, 14 Drawing Sheets

AERIAL IMAGE CAPTURE SYSTEM WITH SINGLE AXIS CAMERA ROTATION

CROSS REFERENCE TO RELATED APPLICATIONS

The present application claims priority to U.S. Provisional Patent Application No. 63/164,288, titled Sinucircular Mechanism and Data Capture Method for Remote Sensing Balloons, and filed on Mar. 22, 2021, which is hereby incorporated by reference for all that it discloses or teaches.

BACKGROUND

High-Altitude Balloons are useful platforms for applications like atmospheric sampling, celestial imaging, and communications repeating. Due to the high vantage point of the stratosphere, there exists potential for using high-altitude balloons for earth observation and remote sensing applications. Yet, there exist fundamental technological hurdles that typically preclude high-altitude balloons from being used for applications where instruments look down at the earth. These hurdles arise largely from the inability to control balloon system speed and from the lightweight nature of such systems that creates vulnerabilities relating to inertial stability.

The first major problem with using high altitude balloons for earth observation applications is placement. Because high-altitude balloons are pushed by the wind, and most commonly do not have propulsion capabilities, it is very difficult to precisely place a high-altitude balloon over a predetermined point on the ground. Without an ability to place a balloon over a specific point on the ground, applications like earth imaging are minimally useful because a balloon operator is not able to choose exactly what they would be imaging. This problem would be lessened if a wide coverage swath from a high-altitude balloon were possible so as to allow a balloon to be placed near but not directly over its target while still collecting useful data.

Another challenge to remote sensing applications using high altitude balloons is stability. Lighter-than-air balloons typically do not have a large mass moment of inertia and therefore do not command significant inertial stability. Balloons also typically travel at very low airspeeds and so do not command substantial aerodynamic stability. Small balloons are very lightweight and are therefore prone to large changes in attitude as a response to relatively small forces. Without a stable operating platform, remote sensing equipment (such as long focal length lenses capturing highly detailed data) may not be able to collect useful data. While sensing equipment that can be actively angled and gimbaled could, in theory, help to address the aforementioned challenges relating to the inability to control balloon placement, the act of moving on-board sensing equipment generates a reaction force that is likely to upset the stability of lightweight systems, causing undesirable wobble and a failure of the equipment to accurately point at and capture its target

SUMMARY

A method for capturing aerial imagery includes capturing a sequence of images from a camera attached to a flight vehicle while the flight vehicle moves in a lateral direction relative to underlying terrain and while concurrently rotating the camera along a circular path about an axis of rotation. The rotation controllably alters a field-of-view of the camera to trace a curved swath of the underlying terrain with each rotation period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

Figure 8A:
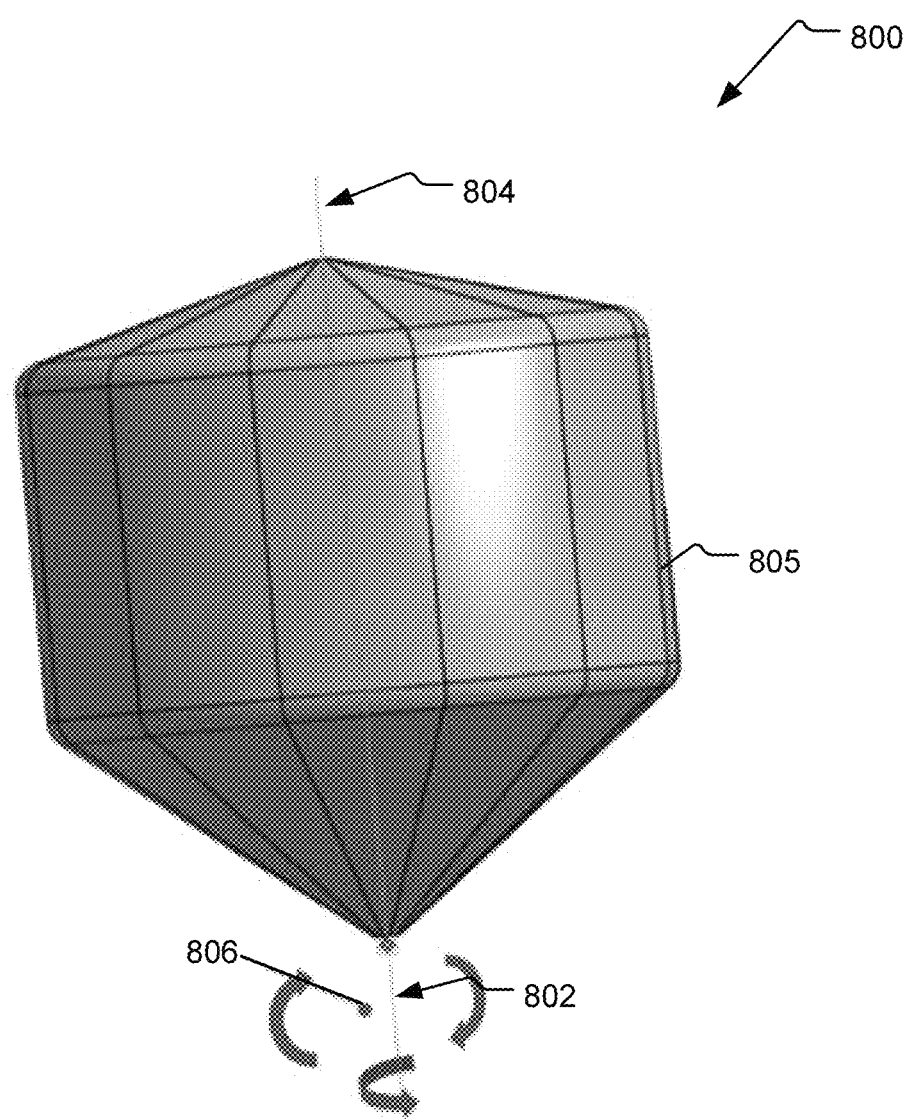
Figure 8B:
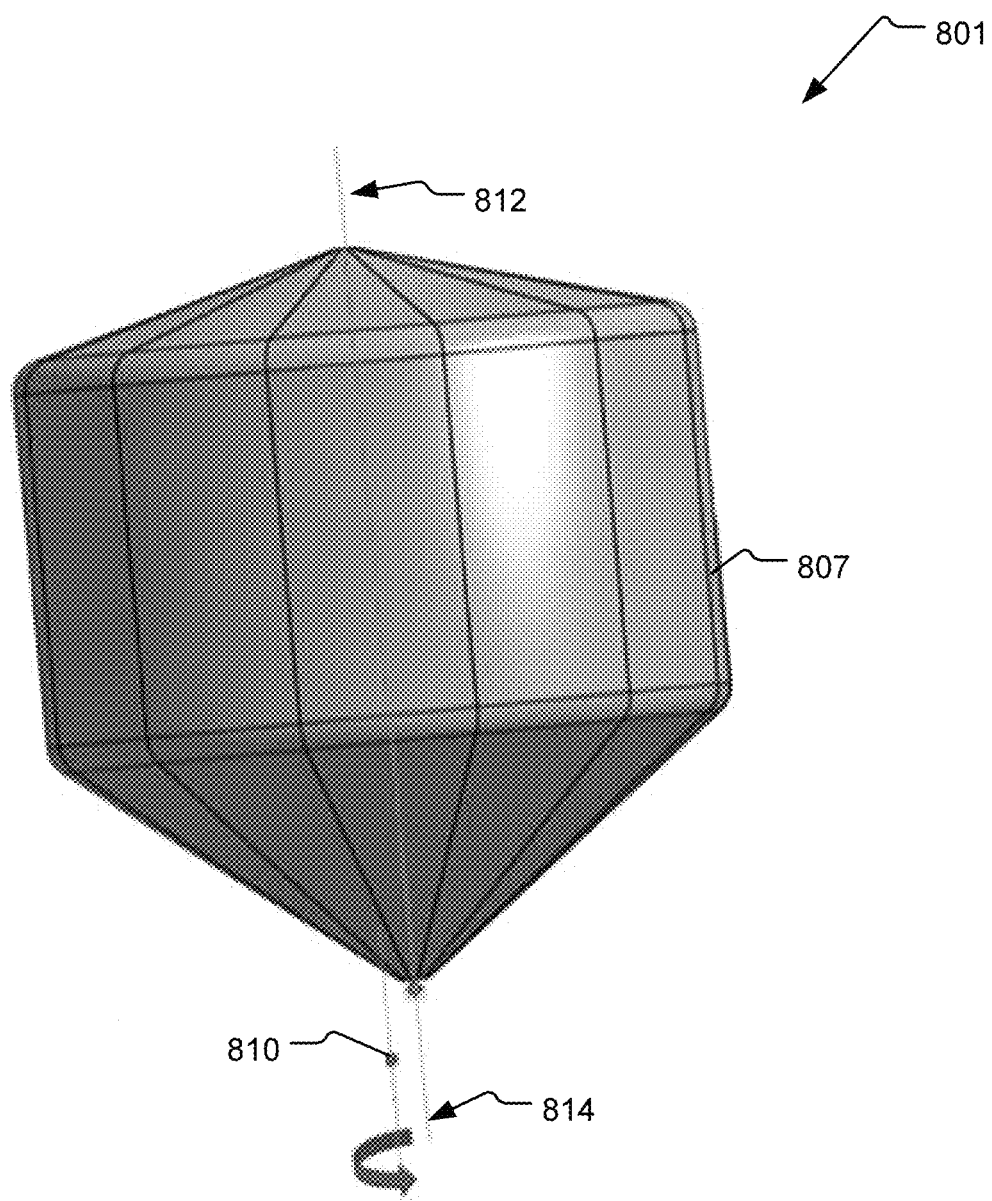

FIG. 8A illustrates a high altitude balloon system with a payload axis of rotation substantially aligned with a principal inertial axis of a balloon but misaligned with the payload center of gravity FIG. 8B illustrates a high altitude balloon system with a payload axis of rotation that is substantially aligned with a center of gravity of the payload but misaligned with a principal inertial axis of the balloon.

Figure 8C:
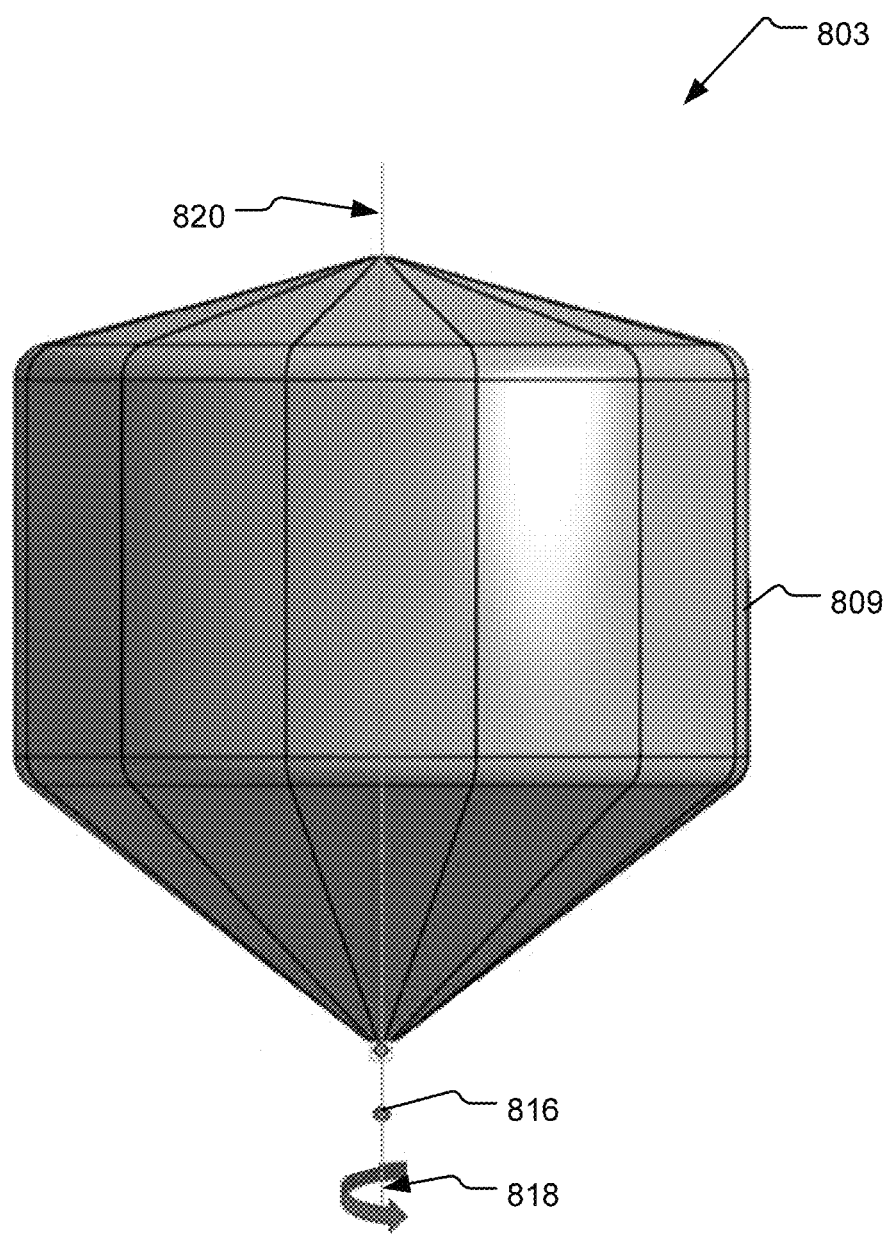

FIG. 8C illustrates another high altitude balloon system with a payload center of gravity substantially aligned with payload axis of rotation, both of which are substantially aligned with a principal inertial axis of a balloon.

Figure 9:
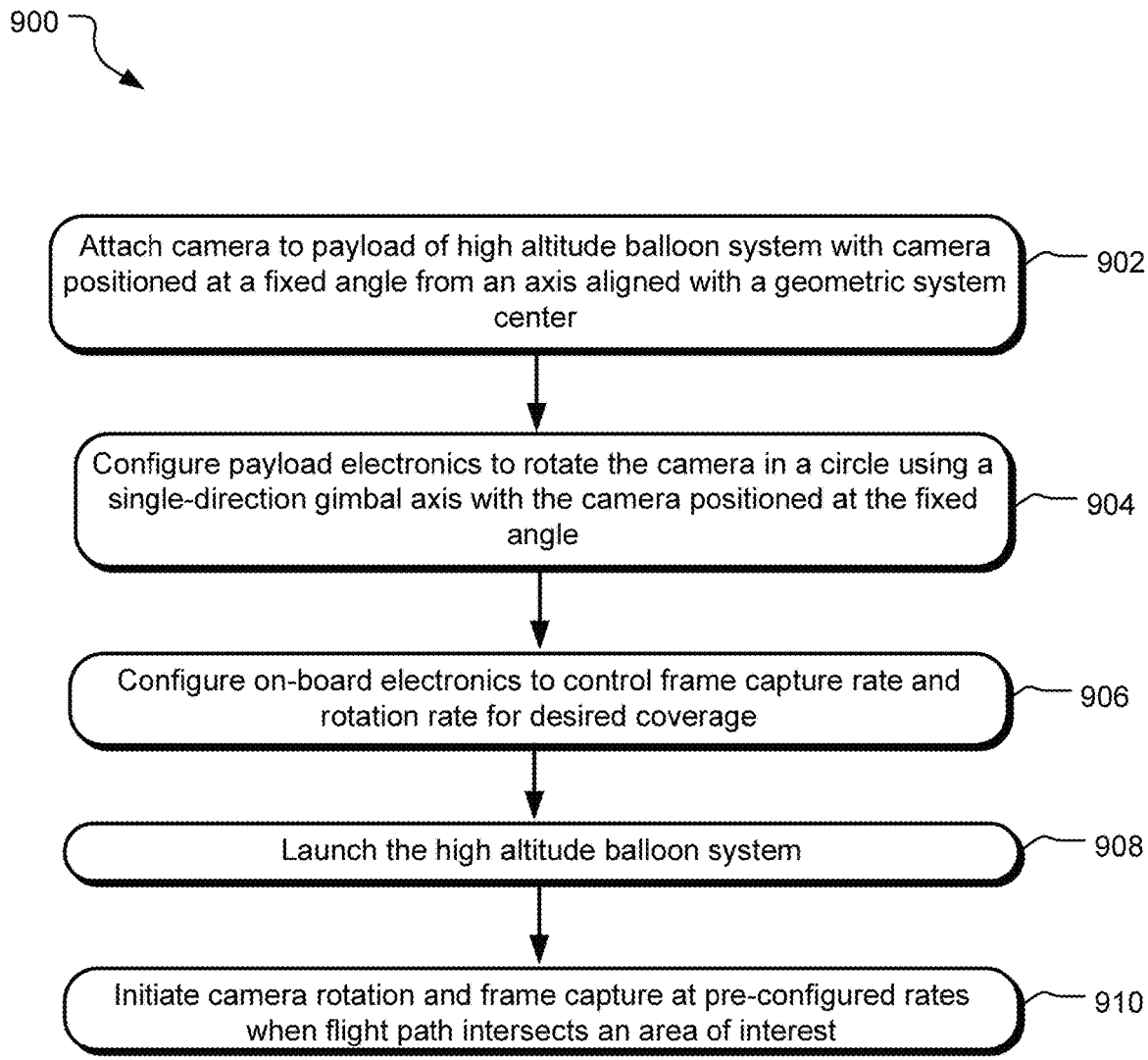

FIG. 9 illustrates example operations for capturing aerial imagery with a high-altitude balloon aerial imaging system.

Figure 10A:
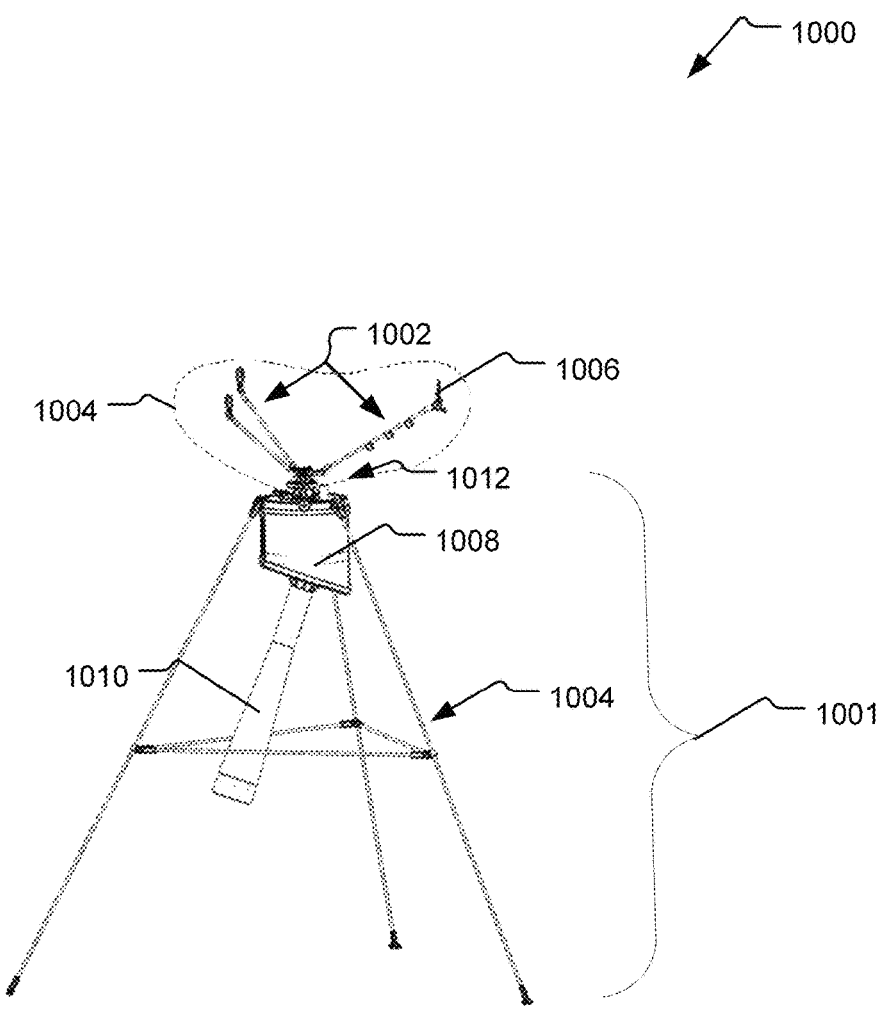

FIG. 10A illustrates aspects of a remote sensing system configured to capture aerial imagery using the techniques discussed herein.

Figure 10B:
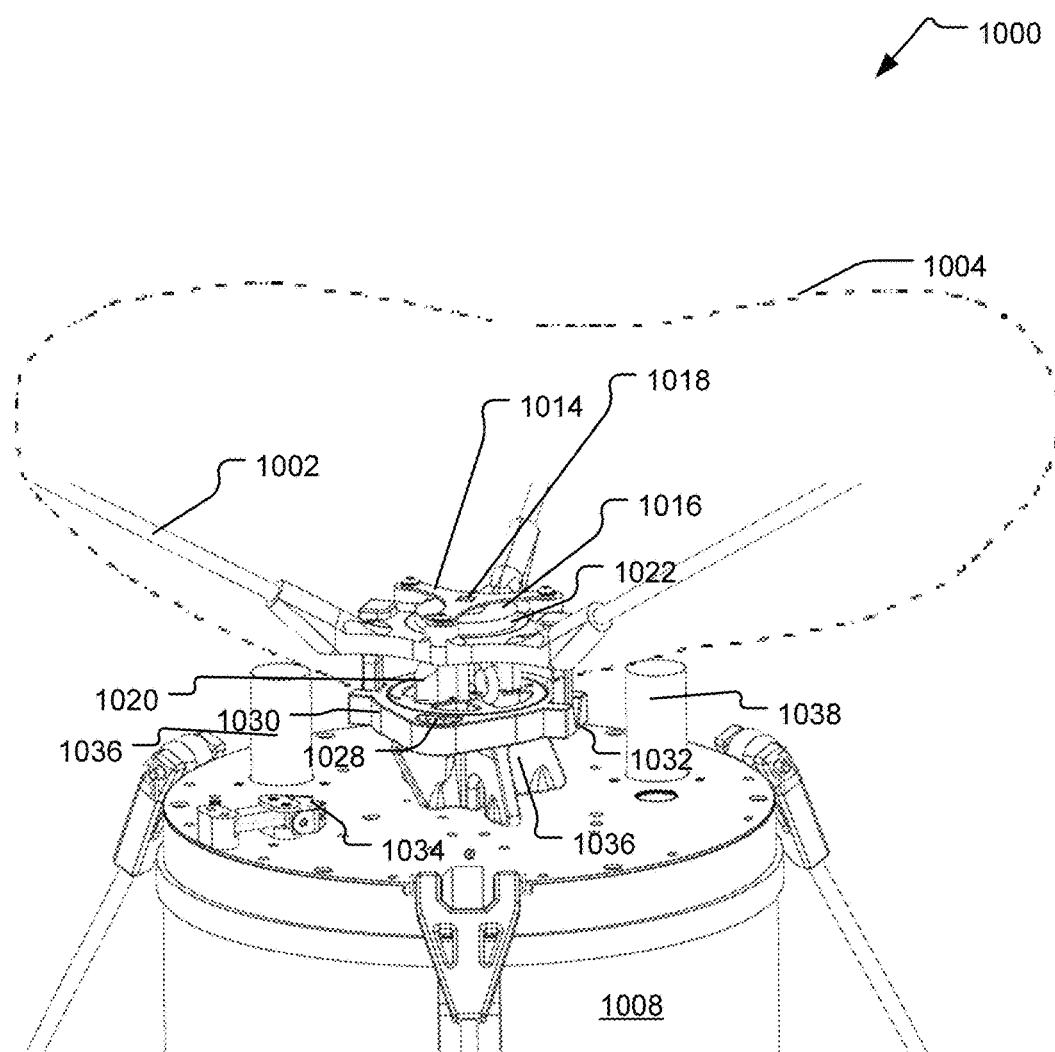

FIG. 10B illustrates further exemplary details of the remote sensing system of FIG. 10A.

Figure 10C:
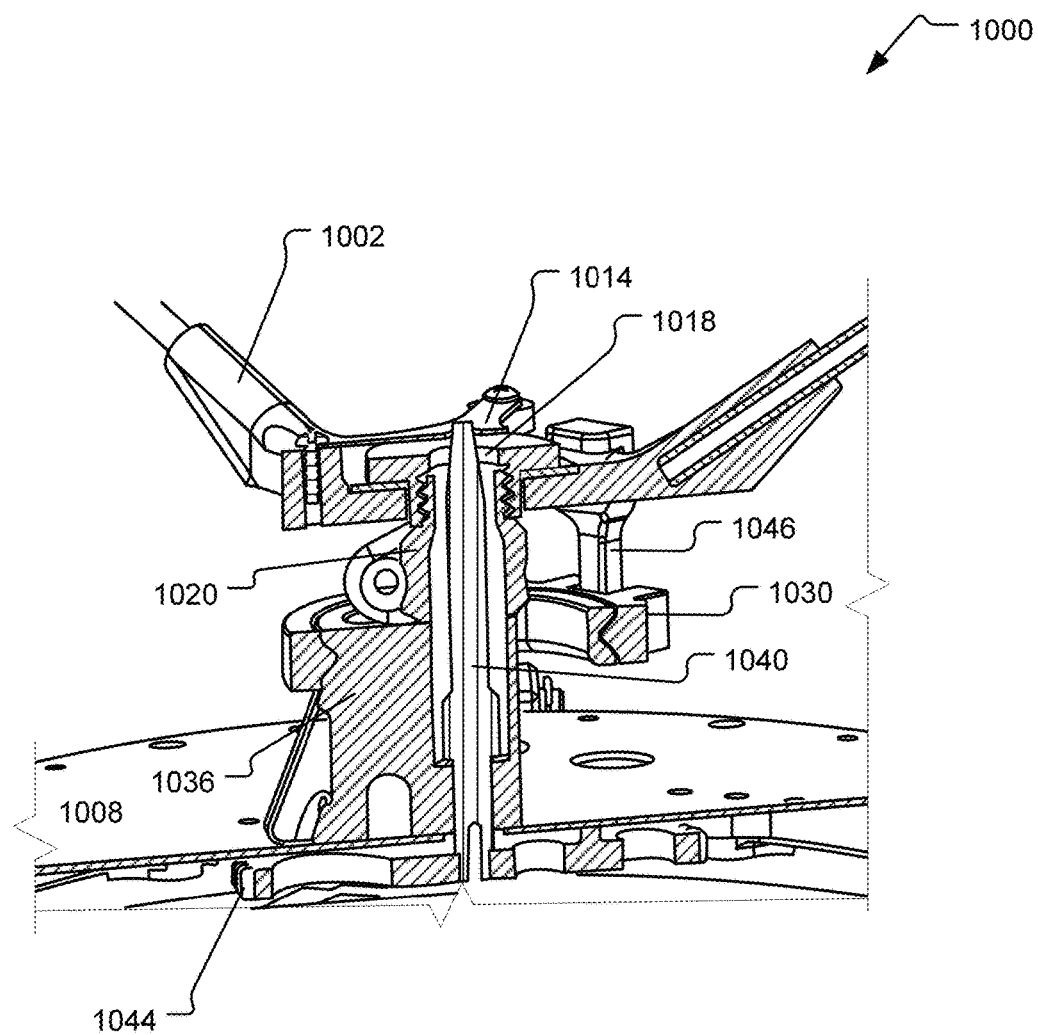

FIG. 10C illustrates a cross sectional view of a portion of the remote sensing system of FIGS. 10A and 10B.

DETAILED DESCRIPTION

Aerial images are commonly captured by manned aircraft or low altitude drones. In both types of vehicle, transit velocity can be controlled along with flight path. Consequently, complete aerial coverage of an underlying area can be easily attained (e.g., by flying in a lawnmower pattern flight path) and the time elapse between images can be easily calculated using the transit velocity and the image frame rate. This time elapse can be useful in a variety of applications such as stereo imaging. In contrast to manned aircraft and drones, high-altitude balloons are propelled by wind and therefore restricted to single flyovers. Since balloon direction and velocity is not always controllable in balloon systems, existing balloon imaging systems tend to rely on cameras that move to provide desired coverage, such as cameras that can be moved along a 3-axes gimbal. However, due to the lightweight nature of high-altitude balloon systems, the smallest camera accelerations (e.g., camera movement starting and stopping) can introduce inertial instabilities that may cause the entire system to undesirably wobble or swing from side to side.

Aerial imaging techniques disclosed herein well adapted for use in lightweight flight vehicles, such as high-altitude balloon systems, to capture wide swaths of aerial imagery that provide full coverage of terrain areas of interest without introducing system perturbations that risk introducing inertial instabilities (e.g., camera accelerations that may cause the system to wobble or sway from side to side). According to one implementation, the foregoing is achieved by fixing a camera at a select angle relative to a geometric center of payload carried by the flight vehicle. For example, rather than pointing the camera straight down along an axis parallel to the direction of gravity (e.g., an earth-normal axis), the camera is fixed at an select angle relative to the earth-normal axis. With the camera fixed at this offset angle, a single-axis gimbal is employed to rotate the camera in a circle around the earth-normal axis while the vehicle is in flight and moving laterally relative to underlying terrain. In one implementation where the rotational axis of the camera is substantially aligned with a gravitational center of the payload, camera rotation is achieved without changing the center of gravity of the payload. Thus, the rotational movement of the camera does not introduce perturbations with the potential to upset the inertial stability of the system (e.g., payload wobble is not introduced by camera movement). As used herein, "substantial alignment" refers generally to an alignment that is within +/−5 degrees of actual alignment.

In the above-described systems, the rotational movement of the camera facilitates imaging of rounded (e.g., semi-circular) swaths of underlying terrain. Due to the transit velocity of the balloon system relative to the underlying terrain, each rounded swath is offset laterally in the direction of vehicle transit from the previously-captured swath, resulting in a coverage area resembling a side-moving spiral that—over several camera period rotations—provides complete coverage of an area of interest. This and other implementations are described in greater detail with respect to the following figures.

Figure 1:
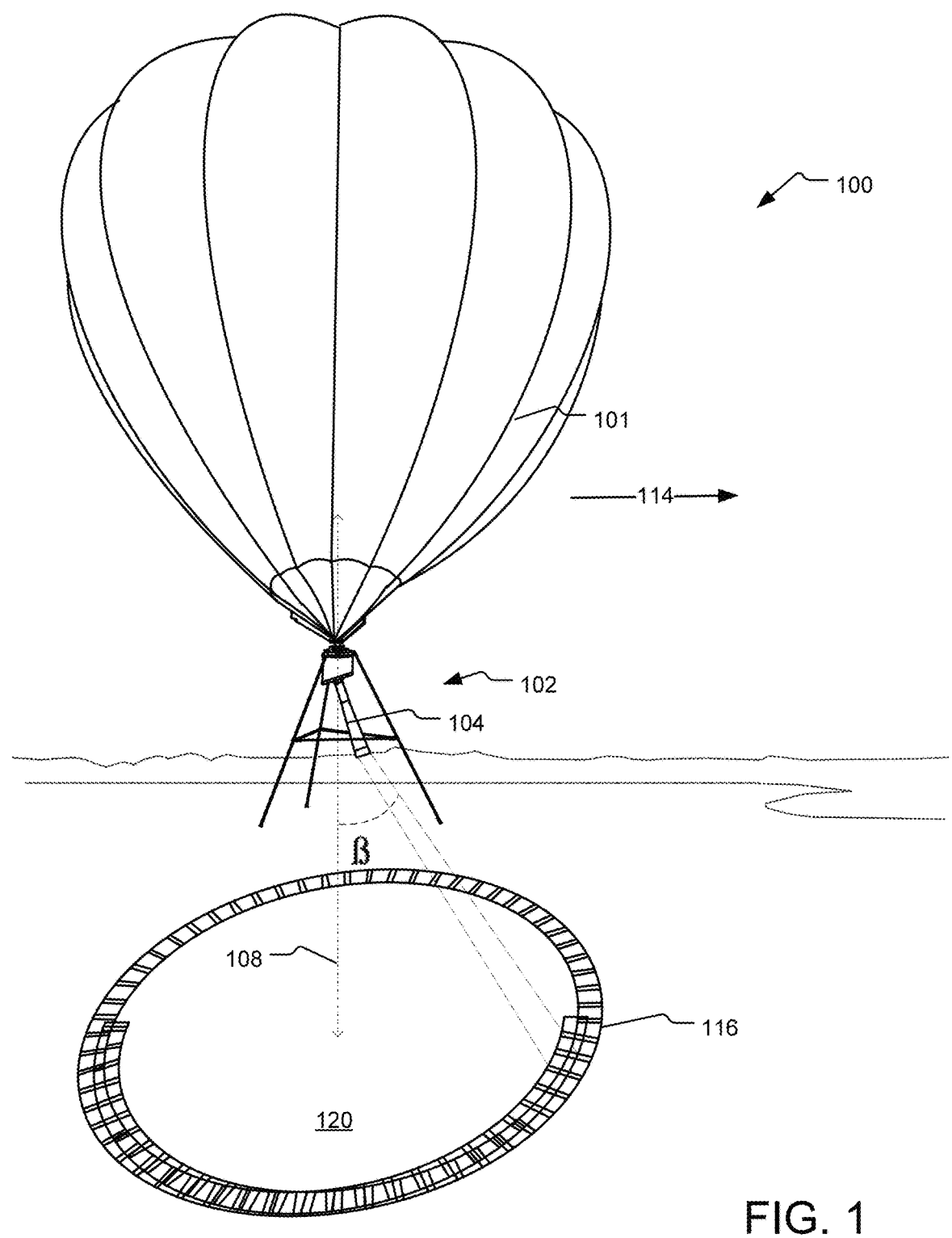
FIG. 1 illustrates an example aerial image capture system that rotates a camera about a single axis to provide complete coverage of an area of interest.

FIG. 1 illustrates an example aerial image capture system 100 that rotates a camera in a circular path about a single axis to provide complete coverage of an area of interest. The system includes a high-altitude balloon 101 supporting a payload 102. In different implementations, the payload 102 may include a variety of remote sensing instruments. By example and without limitation, the payload 102 is shown including a camera 104. However, in some implementations, the herein disclosed imaging techniques are performed by other types of sensors, such as RF. The camera 104 is suspended via a single axis gimbal assembly that rotates the camera 104 in a circular path about a rotational axis 108 while keeping the camera fixed at an off-nadir angle (B). In one implementation, the entire payload 102 rotates about the rotational axis 108, and the rotational axis 108 is aligned with a center of gravity of the payload. In various implementations, the off-nadir angle (B) may vary from between about 5 and 75 degrees.

The high-altitude balloon 101 is propelled laterally (e.g., in a direction represented by arrow 114) relative to underlying terrain by wind. Due to the variability of wind speeds, the system may have a transit velocity subject to uncontrollable changes in magnitude and direction. During a single path flyover of a region of interest, the rotational movement of the camera facilitates capture of a sequence of terrain images offset relative to one another along a path 116 that may be generally circular in shape due to the rotational period of the camera. Notably, the camera 104 has a narrow field-of-view such that the resulting images capture a somewhat "skinny" curved swath that forms a perimeter around a generally circular area 120 that is external to the camera's field of view. That is, the camera 104 images the perimeter of the generally circular area 120 but the area internal to this perimeter is, on any given rotation, external to the field-of-view of the camera 104.

Notably, this path may not be perfectly circular due to elevational changes in terrain and lateral balloon system movement; therefore, the path 116 is referred to herein as being "pseudo-circular." Over a period encompassing several camera rotations, the swath of images grows to include multiple successively-captured pseudo-circular swaths, each being laterally offset from the sequence captured during the last camera rotational period. Due to the fixed off-nadir angle (B) of the camera 104, the imaged area gradually widens over several rotations. When viewed as a whole (e.g., as shown) the string of pseudo-circular swaths resembles a side-moving spiral on the underlying terrain. The result is a full-coverage map of such terrain.

Notably, high altitude balloon systems are very lightweight and thus have low inertial stability. Small forces, such as camera accelerations, in the payload have the potential to shift the center of gravity of the payload 102 and upset the system's inertial stability, which may cause the balloon and payload to start swinging side-to-side. However, the above-described mythology eliminates this problem in implementations where the camera 104 is rotated about a single axis that is aligned with the center of gravity of the payload 102. This technique ensures that the center of the gravity of the payload r102 remains constant throughout the imaging process, preserving inertial stability of the entire system.

Figure 2:
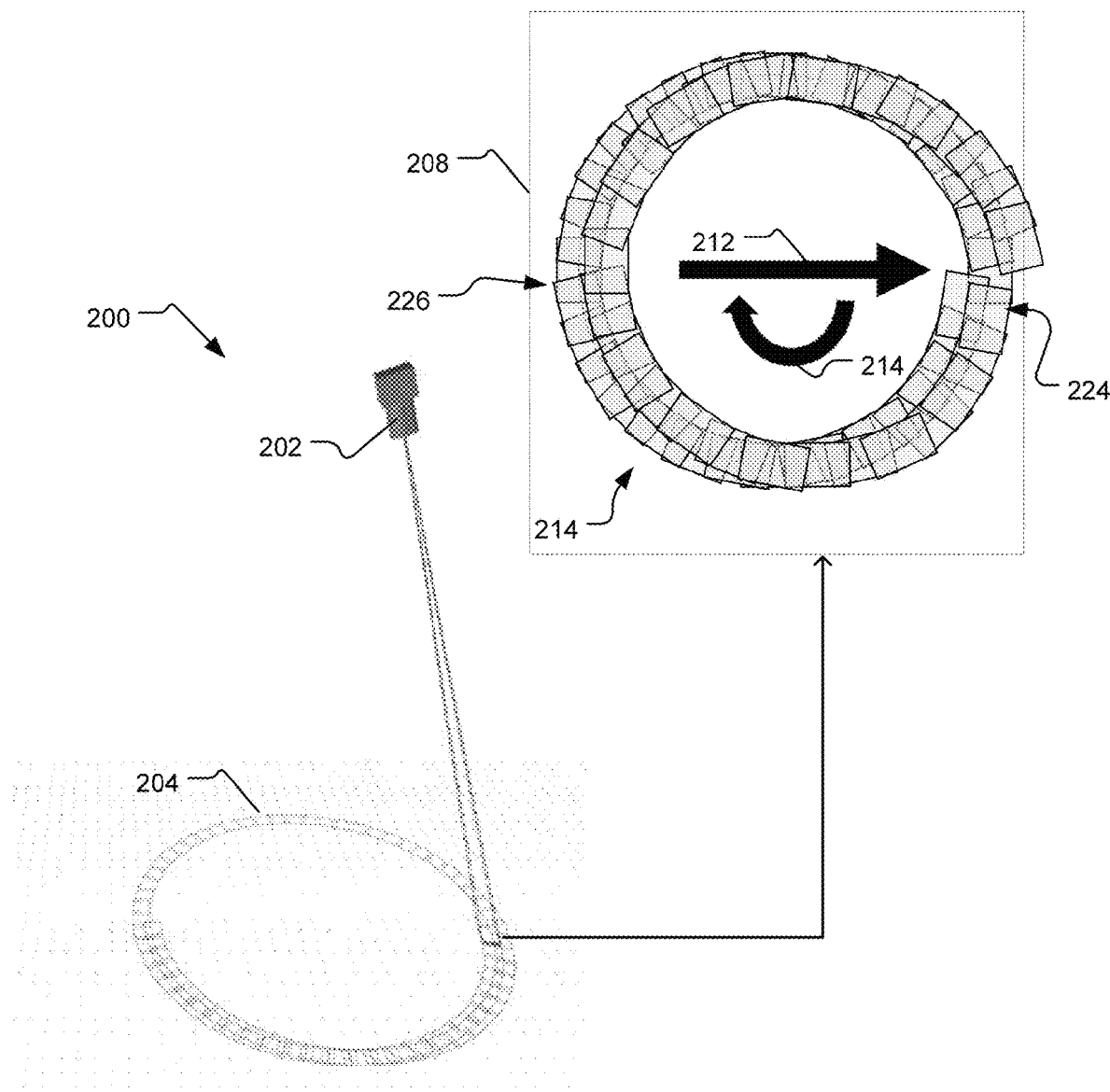
FIG. 2 illustrates an exemplary aerial imaging system with a camera that rotates about a payload gravitational center to capture a swath of images resembling a side-moving spiral.

FIG. 2 illustrates aspects of an exemplary aerial imaging system 200 with a camera 202 that rotates about a gravitational center of a payload to capture a swath 204 of images that resembles a side-moving spiral. Although not shown, the camera may be suspended from a payload supported by flight vehicle, such as in the matter described above with respect to claim 1. According to one implementation, the imaging system and techniques employed to capture the swath 204 are the same as those discussed above with respect to FIG. 1. Top-down view 208 illustrates the swath 204 and its respective images in greater details. The images in the swath 204 are captured during two rotations of the camera 202 while the aerial imaging system 200 moves laterally across the sky in a direction shown by the arrow 212.

By example and without limitation, the images of the swath 204 may be captured when the camera 202 is rotating in the clockwise direction (as shown by arrow 216) when viewed from the top-down (e.g., an earth-facing position).

For clarity of concept, the image set captured in each period of rotation of the camera may be understood as having a leading edge 224 and trailing edge 226, where the leading edge 224 represents an edge of the path corresponding to a camera-forward position relative to the direction 212 of lateral system movement, and where the trailing edge 226 represents an edge of the path captured on the same (most-recent) rotation of the camera 202 when the camera 202 was last positioned 180 degrees opposite the camera position corresponding to the leading edge 224.

If the image set 214 were expanded over several additional camera rotations while the balloon system progressed in the direction represented by the arrow 212, the trailing edge 226 of the period corresponding to the current rotation may, in time, catch up to the images captured proximal to the illustrated position of the leading edge 224. As this happens, the aerial coverage provided by the image set 214 expands laterally, becoming first an oval and then eventually a long strip or swath of aerial imagery corresponding to a wide area of land. In one implementation, each individual frame in the image set is a high-resolution image that can be highly magnified; thus, the collected image set collected during a single flyover of the high-altitude balloon system may provide complete, high magnification coverage of an area of interest.

Figure 3:
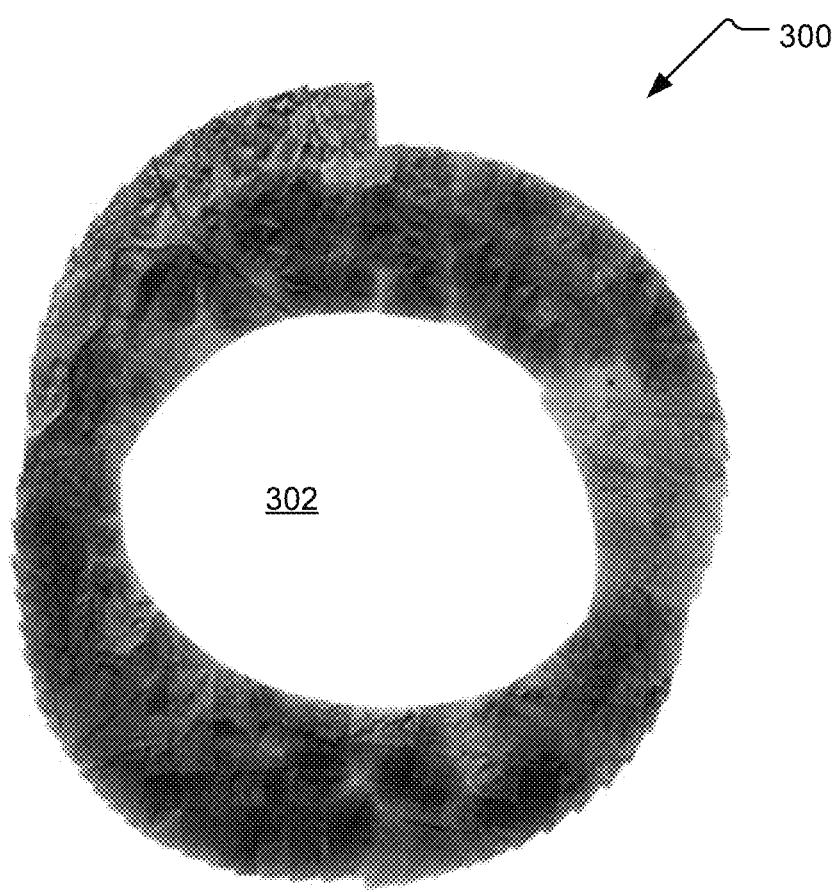
FIG. 3 illustrates an exemplary image set captured via a high-altitude balloon aerial imaging system via the techniques described above with respect to FIG. 2.

FIG. 3 illustrates an exemplary image set 300 captured via an aerial imaging system via the techniques described above with respect to FIG. 1. The image set is a black-and-white representation of data captured by a thermal imager over several rotations of a camera (not shown) about a circular path at a select offset angle from a payload center of gravity (e.g., as described above with respect to FIG. 1 and FIG. 2). As shown, the edges of map generated by the collection of images in the image set 300 have a saw-tooth pattern due to the overlapping arrangement of individual frames captured as the camera was rotated above the scene while rapidly capturing images. If, in the illustrated example, the flight vehicle for the aerial imaging system (e.g., high-altitude balloon) were to continue progressing across the sky, a blank area 302 may in time be filled with captured images providing complete coverage of this area.

Figure 4:
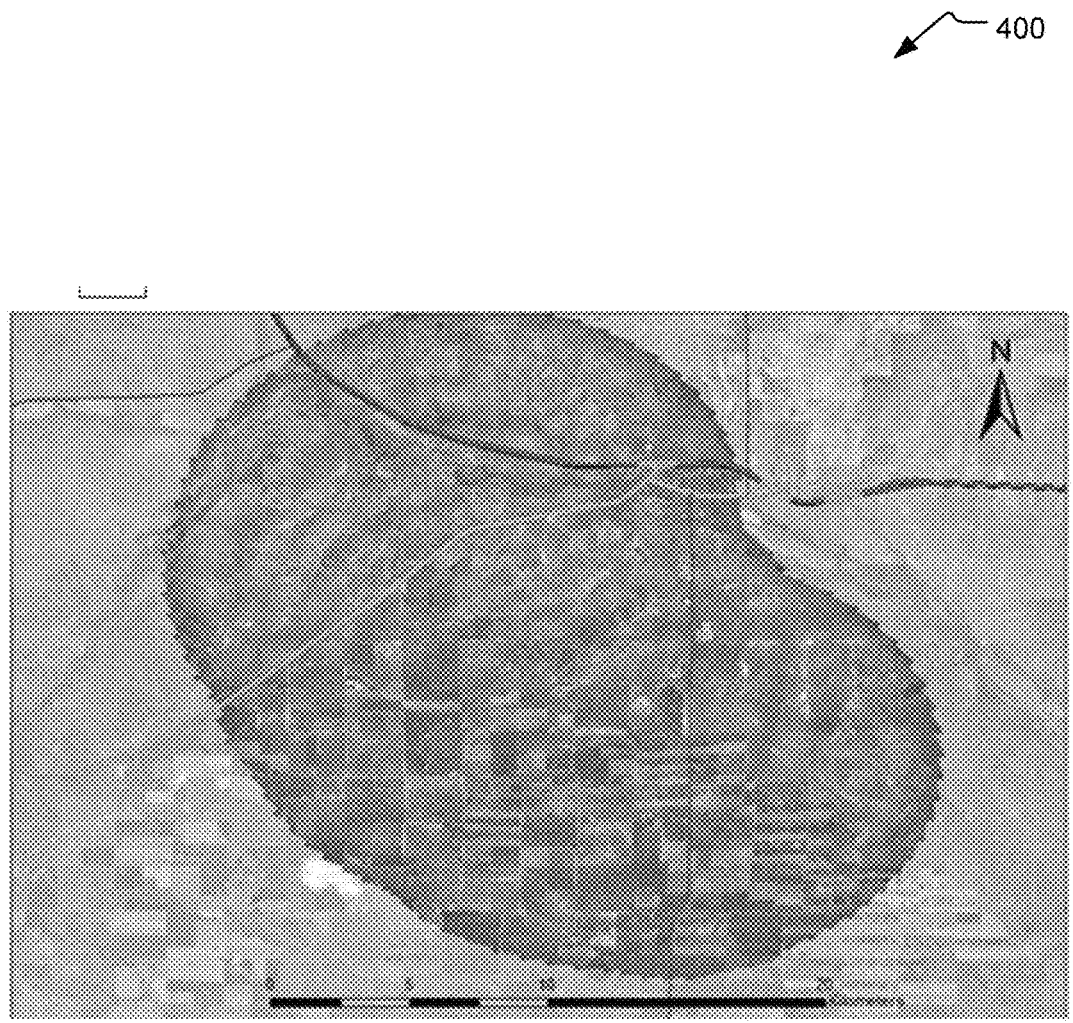
FIG. 4 illustrates another exemplary image set captured via a high-altitude balloon aerial imaging system via the techniques described above with respect to FIG. 1 and FIG. 2.

FIG. 4 illustrates another exemplary image set 400 captured via a high-altitude balloon aerial imaging system via the techniques described above with respect to FIG. 1 and FIG. 2. That is, a rotating camera captures a sequence of images that map to a swath representing a side-moving spiral (e.g., a pseudo-circle that moves laterally with each rotation of the camera). In FIG. 4, the swath of images has grown such that a trailing edge of the most recent period of the spiral-like swath has caught up with the initial leading edge during the first period of the camera's rotation, providing full coverage of an area of interest.

Figure 5:
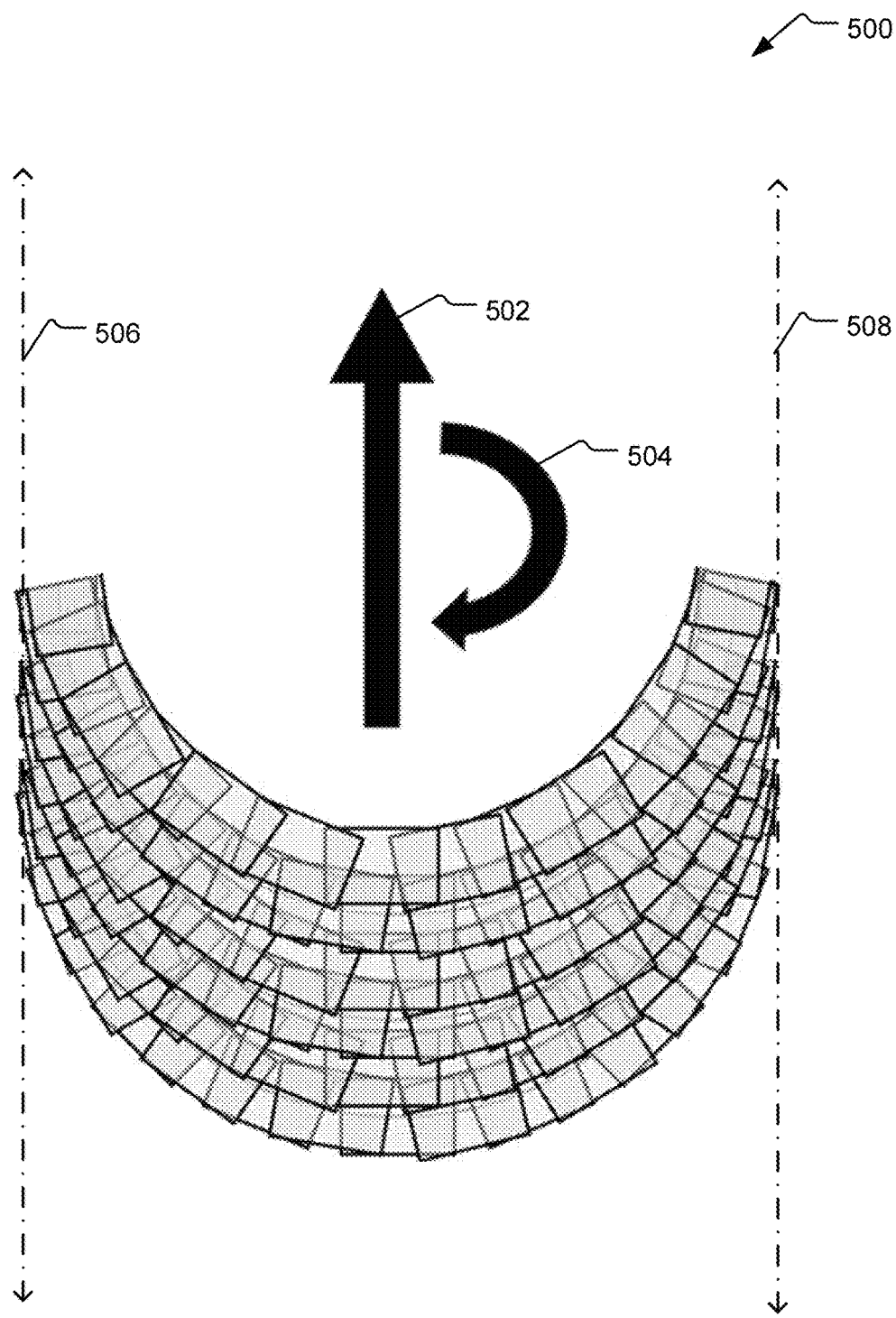
FIG. 5 illustrates an example image set captured via a high-altitude balloon imaging system (not shown) employing the techniques described above with respect to FIG. 1-2.

FIG. 5 illustrates an example image set 500 captured via an aerial imaging system employing the techniques described above with respect to FIG. 1-2. Like the image sets described above, the image set 500 of FIG. 5 may be captured via an imaging system on a high-altitude balloon or other flight vehicle with a camera that rotates (e.g., in a clockwise direction 504) on a single gimbal axis about the gravitational center of a payload. The imaging technique employed to capture the image set 500 differs from those shown and described above with respect to FIG. 1-3 in that the camera is turned off for half of the rotation period.

If the high-altitude balloon system is moving laterally (generally parallel to earth) in the direction of an arrow 502, the trailing edge of images captured shifts in this same direction with each new rotation of the camera. Thus, over time, complete coverage may be obtained of an underlying area in-line with the system's direction of motion (e.g., between bounds 506, 508). Turning the camera off for half of each rotation (as shown) may provide benefits such as power savings, reduced data storage demand, and reduced processing overhead. Conversely, however, this technique eliminates the capture of time-separated images of the same target, which means the image set is not feasible for certain types of imaging techniques, such as stereo imaging, tracking of moving objects, etc.

Figure 6:
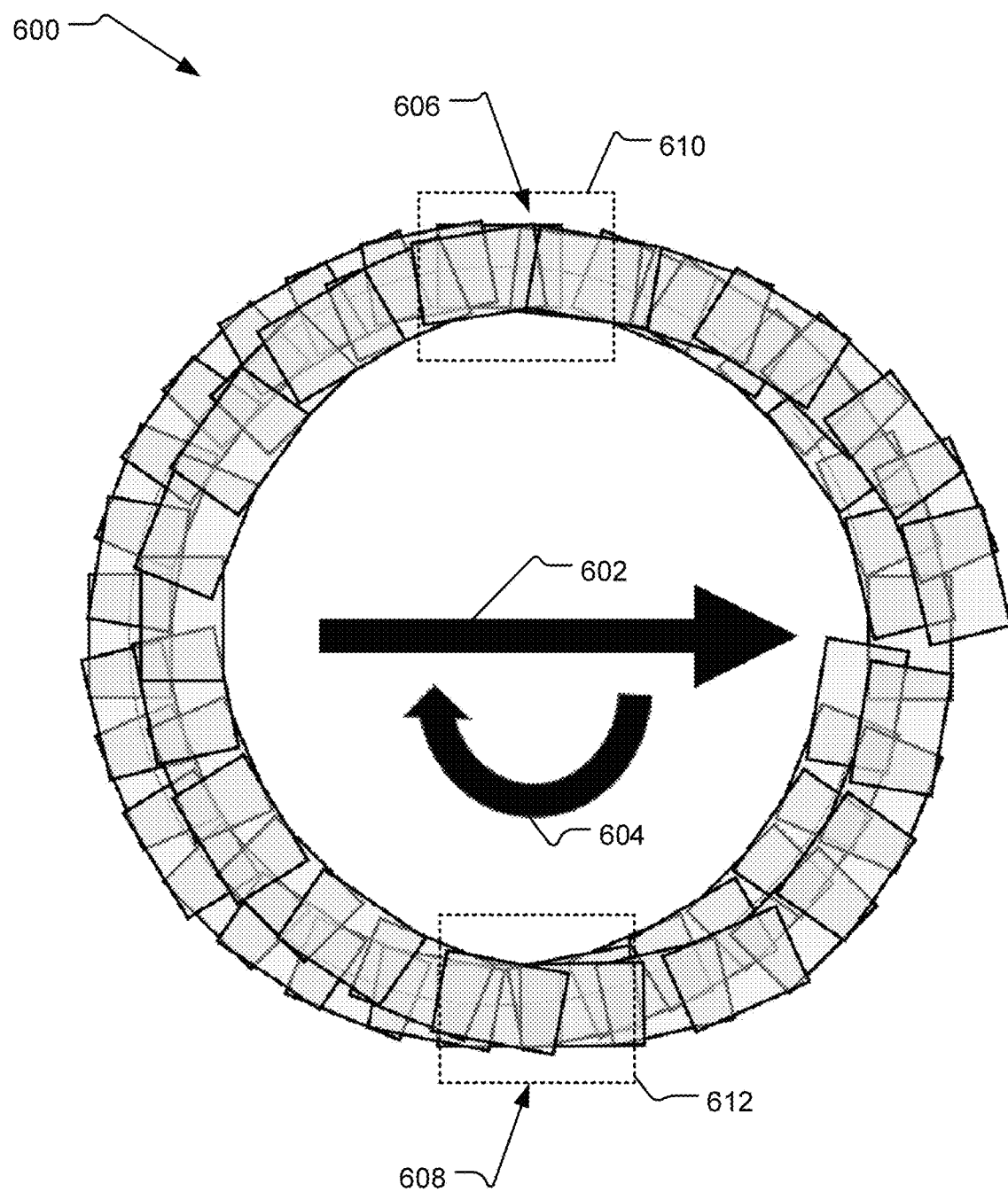
FIG. 6 illustrates another example image set captured via the techniques discussed above, with additional annotations to clarify modifications of the methodology that may be employed in some implementations.

FIG. 6 illustrates another example image set 600 captured via the techniques discussed above. In this figure, additional annotations are shown to clarify modifications of the methodology that may be employed in some implementations. The image set 600 may be understood as captured by an imaging system including a flight vehicle moving laterally relative to earth in a direction indicated by the arrow 602 while a camera attached to a payload of the flight vehicle is rotating in a clockwise direction indicated by the arrow 604. As used herein, the term "sweep velocity" refers to a velocity of the imaged area as it is generated on the ground. "Transit velocity" is used to refer to the lateral velocity of the imaging system relative to earth. Because the sweep velocity of the system may be many times faster than the transit velocity, an image stabilization system could be used to allow for long image integration times without creating motion blur in the images.

Due to the lateral movement of the imaging system, the sweep velocity of the camera adds to the system's transit velocity at a first side edge 606. For the same reason, the sweep velocity of the camera subtracts from the system's transit velocity at a second side edge 608. This phenomena can result in unequal overlap between successively-captured images on each of these opposing sides. That is, the amount of overlap between sequentially-captured images in region 610 will be less than the amount of overlap between sequentially-captured images in region 612. This phenomena is referred to herein as "unequal side lap."

Figure 7A:
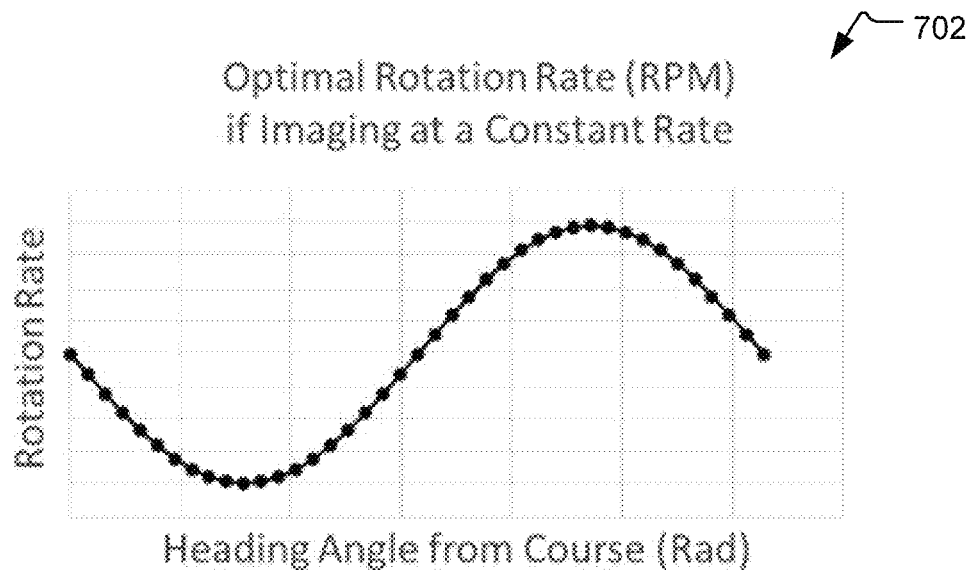
FIG. 7A illustrates variations in camera rotation rate that may be implemented to ensure even side lap in a high-altitude imaging system that captures a swath of images resembling a side-moving spiral.
Figure 7B:
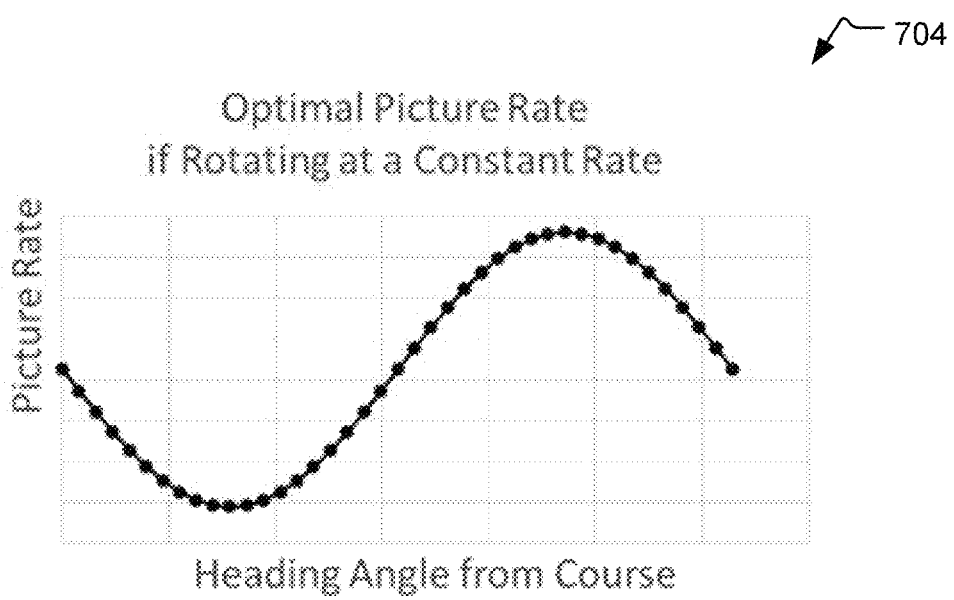
FIG. 7B illustrates variations in image capture rate that may be implemented to ensure even side lap in a high-altitude imaging system that captures a swath of images resembling a side-moving spiral.

In some imaging applications, unequal side lap does not pose a problem and thus no corrective actions are implemented. For example, some systems may implement constant camera rotation and constant frame rate capture. In other applications, however, it may be desirable to "even out" the side lap in the regions 610 and 612 by implementing adjustments to frame capture rate and/or camera rotation rate. For example, if an image processing algorithm were to employ an image stacking or coaddition technique (such as the Lucy-Hook coaddition method) to reduce noise in the imagery, it would need roughly the same number of "layers" of imagery at all locations, which depends upon uniform overlap from frame to frame to avoid some areas having more layers than others and variable image quality in the final product. FIGS. 7A and 7B propose two different types of adjustments to the imaging process that can be implemented to ensure even side lap along the image swath. Both of these adjustments are described with respect to a "heading angle," which may be understood as the angle between the transit velocity vector and a vector defined in the same plane representing the direction the camera is facing at any given point in time.

FIG. 7A illustrates a graph 702 showing example variations in camera rotation rate that may be implemented to ensure even side lap (as defined above) in a high-altitude imaging system with the features discussed with respect to any of FIG. 1-6. Specifically, the graph 702 illustrates a sinusoidal variation in the rotation angle of a camera as a function of the system's heading angle (also defined above). The camera is, in one implementation, rotating in a circle, on a single-gimbal axis, where the circle is centered on the center of gravity for the system's payload. Throughout the rotation, the camera is positioned at a fixed angle from the earth-normal vector. Since the camera is rotated in a circle centered on the payload's gravitational center, camera acceleration and decelerations can be achieved without introducing sway (wobble). Thus, the illustrated variations in the camera rotation rate may be implemented to even-out the image side lap (as defined above) without introducing perturbations that are likely to upset the system's inertial stability.

FIG. 7B illustrates another graph 704 showing example variations in frame capture rate of a camera that may be implemented to ensure even side lap (as defined above) in a high-altitude imaging system with the features discussed with respect to any of FIG. 1-6. Specifically, the graph 704 illustrates a sinusoidal variation in the frame capture rate of the camera as a function of the system's heading angle. This implementation is an alternative to FIG. 7A that may be preferred in some implementations since it can be implemented in software without actuating any mechanical components of the system.

Notably, the exact adjustments to camera rotation rate and/or frame capture rate (picture rate) as a function of heading angle depend upon the desired overlap required, the transit velocity of the system (which is variable at different times), and the camera rotation rate. Using known trigonometric techniques, these variables can be utilized to calculate a minimum frame capture rate sufficient to produce the desired coverage. As shown in FIG. 7A, the rotation rate of the camera may be varied sinusoidally to create a constant image frame side lap at varying sweep velocities. Likewise, as shown in FIG. 7B, the frame capture rate is varied sinusoidally to create a constant image frame side lap at varying sweep velocities.

FIG. 8A-8C illustrate variations in system component alignment that may alter the inertial stability of a high altitude balloon aerial imaging system. In inertially unstable systems, wobble is likely to occur and may impact usability and/or quality of images captured. In all of FIG. 8A-8C, it is assumed that the high-altitude balloon supports a payload (not shown) including a camera fixed at an off-nadir angle. The camera rotates, along with a payload, about a single axis of rotation.

FIG. 8A illustrates a high altitude balloon system 800 with a payload axis of rotation 802 substantially aligned with a principal inertial axis 804 of a balloon 805. A camera (not shown) is fixed at an off-nadir angle and rotated, with the payload, about the payload axis of rotation 802. A center of gravity 806 of the payload is not aligned with either the payload axis of rotation 802 or the principal inertial axis 804 of the balloon 805. Due to this misalignment, the whole high altitude balloon system 800 is likely to wobble as the payload rotates. In some cases, this wobble may render the images captured by the camera unusable.

FIG. 8B illustrates a high altitude balloon system 801 with a payload axis of rotation 808 that is substantially aligned with a center of gravity 810 of the payload. Here, a principal inertial axis 812 of a balloon 807 is not aligned with the payload axis of rotation 814. Due to this misalignment, the whole balloon system is tilted. However, the alignment between the payload center of gravity 810 and the payload axis of rotation 814 (e.g., the camera axis of rotation) ensures the payload does not wobble. Thus, while the configuration is not ideal because the image track may not form an organized curve on flat ground, high quality imagery can still be captured.

FIG. 8C illustrates another high altitude balloon system 803 with a payload center of gravity 816 substantially aligned with payload axis of rotation 818, both of which are substantially aligned with a principal inertial axis 820 of a balloon 809. In this case, the balloon system 803 remains straight (e.g., perpendicular to Earth) and the payload does not wobble. Here, high quality imagery can also be captured.

FIG. 9 illustrates example operations 900 for capturing aerial imagery with a high-altitude balloon aerial imaging system. A payload assembly operation 902 assembles a payload to be attached to a balloon system such that a camera on the payload is positioned at a fixed angle from the system's geometric center. Stated differently, the camera has a field-of-view that is at a fixed angle relative to an axis aligned with the gravitational center of the payload. A camera configuration operation 904 configures on-board payload electronics to rotate the camera in a circle and at the fixed angle about the gravitational center via a single-direction gimbal axis. For example, the camera configuration operation 904 may entail loading memory on the payload with processor-executable instructions that are to be executed by a on-board processor, either at a scheduled time or responsive to receipt from specific command(s) from a ground-based transmitter.

Another configuration operation 906 configures on-board payload electronics to control frame capture rate and camera rotation to achieve a desired coverage. For example, the configuration operation 906 may entail loading on-board memory with processor-executable instructions for rotating the camera and/varying frame capture rate according to preselected parameters determined to be sufficient to provide the desired coverage.

A launching operation 908 launches the high-altitude balloon system and an initiation operation 910 initiates the camera rotation and frame capture according to the preconfigured parameters when a flight path of the system interests an area of interest (e.g., either responsive to receipt from one or more commands or as determined by on-board software based on available system location information and pre-loaded coordinates for the area of interest).

FIG. 10A illustrates aspects of a remote sensing system 1000 configured to capture aerial imagery using the techniques discussed herein. The components include a payload 1001 that may be attached to a balloon or other flight vehicle via a suspension cage 1004 that includes three equidistant suspension arms 1002 that each further include an attachment link 1006 at the end most distal to payload 1001. This equidistant spacing between the suspension arms 1002 serves to stabilize the payload 1001 when in flight by equally distributing weight, thereby helping to prevent the payload 1001 from swinging relative to the flight vehicle (e.g., a high-altitude balloon) in high winds.

In the illustrated implementation, the payload 1001 includes a payload cannister 1008 supporting a camera with a lens 1010. The payload cannister 1008 includes electronics that control rotation of the payload 1001 relative to the suspension cage 1004. In addition to supporting the camera and lens 1010 (e.g., an aerial imaging high-resolution camera) the payload cannister 1008 may support and/or encase other control electronics and sensing equipment such as memory, one or more processors, other sensors, etc. In one implementation, the payload includes memory storing processor-executable instructions for controllably rotating the camera and/or selectively varying frame rate or camera rotation rate consistent with the methodology described with respect to FIG. 1-8 above. In FIG. 10A, the payload 1001 includes a rotation mechanism 1012 that is used to rotate the payload cannister 1008 and its remote sensing instruments (e.g., the camera and lens 1010) against a balloon envelope or other flight vehicle to create a uniform remote sensing swath as shown and described with respect to other figures herein.

FIG. 10B illustrates further exemplary details of the remote sensing system of FIG. 10A. In this view, the suspension arms 1002 are shown affixed to a central bracket which is affixed to a drive plate 1014. The drive plate 1014 includes a drive slot 1018 that may receive a driveshaft (not shown in FIG. 10A). The driveshaft may be inserted in the drive slot 1018 and rotated by motor to effectively rotate the payload cannister 1008 relative to the suspension cage 1004 (e.g., which includes suspension arms 1002, drive plate 1014, thrust bearing 1022, and a thrust bushing 1016 that is affixed to a separation block 1020).

In the specific implementation of FIG. 10B, the payload (e.g., including payload cannister 1008, rotation base 1036, and slip ring 1030) are designed to be controllably released from the suspension cage 1004 to initiate a termination sequence for the flight vehicle which is, in this implementation, a high altitude balloon. For example, the payload may be tethered to an upper end of a balloon envelope such that a controlled release of the payload tensions the tether and causes the balloon envelope to invert, releasing lift gas from an aperture that initially served as a vent duct. A detailed example of this type of system is described in detail in U.S. Pat. No. 10,953,975, entitled "Reusable Balloon System" (hereinafter the '975 patent) which is hereby incorporated by reference for all that it discloses or teaches. In one implementation consistent with the teachings of the '975 patent, the high-altitude balloon system includes a tether with a first end attached to an upper end of the balloon envelope (e.g., the end of the balloon facing away from earth when the balloon is in flight). An opposite end of the tether is attached to the payload. However, as described above, the payload cannister is designed to rotate during flight relative to the balloon envelope. In order to ensure that the tether does not get tangled around the payload, the tether is attached to an aperture 1028 in a slip ring 1030 that stays indexed relative to the balloon envelope and to the suspension cage 1004. The slip ring 1030 is, for example, a silicon dry-lubricated ring that slips relative to the rotation base 1036 that turns along with the payload cannister 1008.

Although the slip ring 1030 does not rotate with the payload cannister 1008, it may be configured to remain attached to the remainder of the payload (e.g., the payload cannister 1008 and rotation base 1036) when the payload is released from the suspension cage 1004 during a controlled flight termination sequence, as described in the '975 patent.

In FIG. 10B, the weight of payload cannister 1008 is supported a thrust bushing 1022 affixed to a separation block 1020, both of which stay attached to the suspension arms 1002 when the payload is controllably released. Controlled release of the payload (including the rotation base 1036, payload cannister 1008, and slip ring 1030) from the separation block 1020 may be enabled by a hotwire cutter mechanism 1034 that cuts through a structural attachment cord (not shown) laced through the rotation base 1036 and attached to the separation block 1020. The severing of this structural attachment cord causes the payload cannister 1008, rotation base 1036, and slip ring 1030 to fall away from the suspension cage 1004 (e.g., including the separation block 1020 and suspension arms 1002 among other components).

FIG. 10C illustrates a cross sectional view of the remote sensing system shown in FIGS. 10A and 10B. In this view, suspension arms 1002 are shown affixed to a drive plate 1014 that includes a drive slot 1018. A driveshaft 1040 (excluded from the view of FIG. 10B) is shown threaded through the drive slot 1018 and through both the rotation base 1036 and the separation block 1020. Rotation of the payload cannister 1008 is affected by a motor (not shown) that turns a rotating gear 1044 affixed to the driveshaft 1040, rotating both the rotation base 1036 and the payload cannister 1008.

By example and without limitation, the system may further include an arm 1046 engaged with the slip ring 1030. The arm 1046 is fixed relative to the suspension cage 1004, and the inside of the slip ring 1030 is affixed to the rotation base 1036. Thus, the slip ring 1003 remains fixed relative to the arm 1046 while the payload cannister 1008 rotates against the slip ring 1030.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of capturing aerial imagery from a balloon, the method comprising:
    capturing a sequence of images from a camera attached to a payload of the balloon while varying a frame capture rate sinusoidally as a function of a heading angle of the camera as the balloon moves in a lateral direction relative to underlying terrain and while concurrently rotating the camera along a circular path continuously and exclusively about a single axis of rotation substantially aligned with a center of gravity of the payload, the rotation controllably altering a field-of-view of the camera to trace a curved swath of the underlying terrain with each rotation period of the camera
    wherein each sequentially-captured image in the sequence of images overlaps with a previously-captured image such that the sequence completely images a continuous portion of the curved swath of underlying terrain.

2. The method of claim 1, wherein the camera captures fixed at an angle between 5 and 75 degrees from an Earth-normal vector.

3. The method of claim 1, wherein the axis of rotation of the camera is substantially aligned with a principal inertial axis of the balloon.

4. The method of claim 1, wherein varying the frame capture rate throughout each rotation period of the camera achieves a substantially uniform overlap between a first set of consecutively-captured images corresponding to a first side of the curved swath and a second set of consecutively-captured images corresponding to a second opposite side of the curved swath.

5. The method of claim 1, further comprising:
    varying a rotation rate of the camera throughout each rotation period of the camera to achieve substantially uniform overlap between every frame.

6. The method of claim 5, wherein the rotation rate of the camera is varied sinusoidally as a function of a heading angle of the camera.

7. The method of claim 1, wherein a camera rotation rate remains constant throughout multiple rotation periods of the camera.

8. The method of claim 1, wherein the camera field-of-view traces multiple curved swaths over multiple camera rotations, the multiple curved swaths being linked together and resembling a side-moving spiral.

9. An aerial imaging system comprising:
a flight vehicle; and
a payload suspended from the flight vehicle, the payload including a camera and control electronics configured to capture a sequence of images while varying a frame capture rate sinusoidally as a function of a heading angle of the camera and while rotating the camera along a circular path continuously and exclusively about a single axis of rotation while the flight vehicle moves in a lateral direction relative to underlying terrain, the rotation controllably altering a field-of-view of the camera to trace a curved swath of the underlying terrain with each rotation period of the camera,
wherein each sequentially-captured image in the captured sequence of images overlaps with a previously-captured image such that the sequence completely images a continuous portion of the curved swath of underlying terrain.

10. The aerial imaging system of claim 9, wherein a center of gravity of the payload substantially aligns with the single axis of rotation of the camera.

11. The aerial imaging system of claim 9, wherein the control electronics are further configured to vary a frame capture rate throughout each rotation period of the camera to achieve substantially uniform overlap between a first set of consecutively-captured images corresponding to a first side of the curved swath and a second set of consecutively-captured images corresponding to a second opposite side of the curved swath.

12. The aerial imaging system of claim 11, wherein the control electronics are further configured to vary the frame capture rate sinusoidally as a function of a heading angle of the camera.

13. The aerial imaging system of claim 9, wherein varying the rotation rate of the camera throughout each rotation period of the camera achieves a substantially uniform overlap between every frame.

14. The aerial imaging system of claim 9, wherein the control electronics are configured to maintain a constant camera rotation rate throughout multiple rotation periods of the camera.

15. One or more non-transitory computer-readable storage media encoding computer-executable instructions for executing a computer process, the computer process comprising:
capturing a sequence of images from a camera attached to a flight vehicle while the flight vehicle moves in a lateral direction relative to underlying terrain and while concurrently rotating the camera along a circular path continuously and exclusively about a single axis of rotation, the rotation controllably altering a field-of-view of the camera to trace a curved swath of the underlying terrain with each rotation period of the camera,
wherein each sequentially-captured image in the captured sequence of images overlaps with a previously-captured image such that the sequence completely images a continuous portion of the curved swath of underlying terrain.

16. The one or more non-transitory computer-readable storage media of claim 15, wherein the computer process further comprises:
varying a rotation rate of the camera throughout each rotation period of the camera.

17. The one or more non-transitory computer-readable storage media of claim 16, wherein varying the frame capture rate of the camera further comprises
varying the rotation rate of the camera sinusoidally as a function of a heading angle of the camera.

* * * * *